US009908544B2

(12) United States Patent
Seaton et al.

(10) Patent No.: US 9,908,544 B2
(45) Date of Patent: Mar. 6, 2018

(54) SYSTEM AND METHOD FOR REMOTELY CONFIGURING LOCOMOTIVES

(71) Applicant: Electro-Motive Diesel, Inc., La Grange, IL (US)

(72) Inventors: James David Seaton, Westmont, IL (US); Alexander Shubs, Jr., Chicago, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 110 days.

(21) Appl. No.: 14/689,158

(22) Filed: Apr. 17, 2015

(65) Prior Publication Data
US 2016/0304105 A1    Oct. 20, 2016

(51) Int. Cl.
*B60T 17/22* (2006.01)
*B61L 27/00* (2006.01)
*B61L 15/00* (2006.01)

(52) U.S. Cl.
CPC ....... *B61L 27/0038* (2013.01); *B61L 15/0027* (2013.01); *B61L 27/0077* (2013.01);
(Continued)

(58) Field of Classification Search
USPC ..... 701/2, 19–20; 246/187 A, 167 R, 182 R, 246/1 C, 187 C; 105/26.05; 303/13, 16
See application file for complete search history.

(56) References Cited

U.S. PATENT DOCUMENTS 2,113,207 A  *  4/1938  Yingling ............... H02P 9/00
105/35
6,144,901 A     11/2000  Nickles et al.
(Continued)

FOREIGN PATENT DOCUMENTS

AU    2013206474 A1    7/2013
KR     101023533 B1    3/2011

OTHER PUBLICATIONS

Dynamic monitoring system of highspeed railway based on GPS/SINS; Li Huan; Zhang Xu; Ren Bo; Mechatronics and Control (ICMC), 2014 International Conference on; Year: 2014; pp. 1617-1619, DOI: 10.1109/ICMC.2014.7231832.*

(Continued)

*Primary Examiner* — Cuong H Nguyen
(74) *Attorney, Agent, or Firm* — Finnegan, Henderson, Farabow, Garrett & Dunner, LLP

(57) ABSTRACT

A control system for remotely configuring a locomotive may include an operational control device located on-board the locomotive, wherein the operational control device may be configured in a run configuration when the locomotive is ready for travel. An on-board controller located on-board the locomotive may be configured to switch the operational control device to the run configuration upon receipt of a configuration command signal. An off-board remote controller interface located remotely from the locomotive may be configured to receive a configuration failure signal, wherein the configuration failure signal may be indicative of the operational control device being in a configuration other than the run configuration. The off-board remote controller interface may selectively send the configuration command signal to the on-board controller to switch the operational control device to the run configuration.

20 Claims, 2 Drawing Sheets

(52) U.S. Cl.
CPC ............. *B60T 17/22* (2013.01); *B60T 17/221* (2013.01); *B60T 2201/00* (2013.01)

(56) References Cited

U.S. PATENT DOCUMENTS

| | | | | |
|---|---|---|---|---|
| 6,189,980 | B1* | 2/2001 | Kull | B60T 13/665 |
| | | | | 303/15 |
| 6,580,975 | B2 | 6/2003 | Lovelace, II et al. | |
| 6,876,907 | B2 | 4/2005 | Kanner et al. | |
| 6,975,927 | B2* | 12/2005 | Szklar | B61L 3/125 |
| | | | | 246/167 R |
| 7,072,747 | B2* | 7/2006 | Armbruster | B61L 3/006 |
| | | | | 246/122 R |
| 7,133,756 | B2 | 11/2006 | Jammu et al. | |
| 7,280,013 | B2 | 10/2007 | Lewis | |
| 7,618,011 | B2 | 11/2009 | Okeski et al. | |
| 8,364,338 | B2 | 1/2013 | Peltonen et al. | |
| 8,406,942 | B2* | 3/2013 | Siddappa | B61C 17/12 |
| | | | | 455/92 |
| 8,589,001 | B2* | 11/2013 | Siddappa | B61C 17/12 |
| | | | | 455/92 |
| 8,655,505 | B2 | 2/2014 | Sprock et al. | |
| 8,868,267 | B2 | 10/2014 | Deitz et al. | |
| 8,914,168 | B2 | 12/2014 | Chundru et al. | |
| 2003/0083791 | A1* | 5/2003 | Szklar | B61L 3/125 |
| | | | | 701/2 |
| 2005/0189815 | A1* | 9/2005 | Bryant | B60L 15/38 |
| | | | | 303/7 |
| 2006/0138285 | A1* | 6/2006 | Oleski | B61L 25/025 |
| | | | | 246/167 R |
| 2008/0269967 | A1 | 10/2008 | Kumar et al. | |
| 2010/0029209 | A1 | 2/2010 | Daum et al. | |
| 2010/0204856 | A1 | 8/2010 | Smith et al. | |
| 2010/0235022 | A1* | 9/2010 | Siddappa | B61C 17/12 |
| | | | | 701/20 |
| 2011/0118914 | A1* | 5/2011 | Brooks | B61L 3/006 |
| | | | | 701/20 |
| 2012/0123617 | A1 | 5/2012 | Noffsinger et al. | |
| 2012/0259488 | A1* | 10/2012 | Siddappa | B61C 17/12 |
| | | | | 701/20 |
| 2012/0290157 | A1* | 11/2012 | Siddappa | B61C 17/12 |
| | | | | 701/20 |
| 2013/0018531 | A1* | 1/2013 | Kumar | B61L 3/006 |
| | | | | 701/2 |
| 2013/0113579 | A1 | 5/2013 | Barnas et al. | |
| 2014/0081488 | A1 | 3/2014 | Erhard et al. | |
| 2014/0094998 | A1 | 4/2014 | Cooper et al. | |
| 2014/0117167 | A1 | 5/2014 | Donnelly, III | |

OTHER PUBLICATIONS

Wireless communications based system to monitor performance of rail vehicles; B. Nejikovsky; E. Keller; Railroad Conference, 2000. Proceedings of the 2000 ASME/IEEE Joint; Year: 2000; pp. 111-124, DOI: 10.1109/RRCON.2000.869993.*

Of current interest: Radio remote control runs experimental train on new haven railroad; Electrical Engineering; Year: 1956, vol. 75, Issue: 1; pp. 90-91, DOI: 10.1109/EE.1956.6442400.*

A Novel Framework of Fast and Unambiguous Link Failure Localization via Monitoring Trails; Bin Wu; Pin-Han Ho; Janos Tapolcai; Xiaohong Jiang; 2010 INFOCOM IEEE Conference on Computer Communications Workshops; Year: 2010; pp. 1-5, DOI: 10.1109/INFOCOMW.2010.5466637.*

Design of remote controller of multiple unit locomotives for coal freight train in South Sumatera Indonesia; Y. Haroen; R. T. Desmana; The Fifth International Conference on Power Electronics and Drive Systems, 2003. PEDS 2003; Year: 2003, vol. 2 pp. 978-981 vol. 2, DOI: 10.1109/PEDS.2003.1283102.*

Performance analysis on synchronous control of Da-Qin heavy-haul railway locomotives; Ying Wang; Jiang Lu; Lian-chuan Ma; Yuan Cao; Jian-cheng Mu; 2015 IEEE 6th International Symposium on Microwave, Antenna, Propagation, and EMC Technologies (MAPE); Year: 2015; pp. 323-328, DOI: 10.1109/MAPE.2015.7510324.*

Control strategy and reliability study of iLOCK high-speed railway interlocking system; Guan Hong; XiuHong Yuan; 2011 International Conference on Remote Sensing, Environment and Transportation Engineering; Year: 2011 pp. 3950-3953, DOI: 10.1109/RSETE.2011.5965183.*

Organic Rankine Cycle for Vehicles: Control Design and Experimental Results; Johan Peralez; Madiha Nadri; Pascal Dufour; Paolino Tona; Antonio Sciarretta; IEEE Transactions on Control Systems Technology; Year: 2017, vol. 25, Issue: 3 pp. 952-965.*

Design and Comparison of Robust Nonlinear Controllers for the Lateral Dynamics of Intelligent Vehicles; Gilles Tagne; Reine Talj; Ali Charara; IEEE Transactions on Intelligent Transportation Systems; Year: 2016, vol. 17, Issue: 3; pp. 796-809.*

Design of remote controller of multiple unit locomotives for coal freight train in South Sumatera Indonesia; Y. Haroen; R. T. Desmana; The Fifth International Conference on Power Electronics and Drive Systems, 2003. PEDS 2003.; Year: 2003, vol. 2 pp. 978-981 vol. 2.*

Power management strategy study for a multiple unit train; S. Lu; S. Hillmansen; C. Roberts; IET Conference on Railway Traction Systems (RTS 2010); Year: 2010; pp. 1-6.*

Seaton et al., U.S. Appl. No. 14/689,191, Autonomous Reset System, filed Apr. 17, 2015.

Seaton, U.S. Appl. No. 14/689,173, "System and Method for Remotely Operating Locomotives", filed Apr. 17, 2015.

Seaton, U.S. Appl. No. 14/689,617, "System and Method for Autonomous Control of Locomotives", filed Apr. 17, 2015.

* cited by examiner

SYSTEM AND METHOD FOR REMOTELY CONFIGURING LOCOMOTIVES

TECHNICAL FIELD

The present disclosure relates generally to a system and method for configuring locomotives and, more particularly, to a system and method for remotely configuring locomotives.

BACKGROUND

Rail vehicles may include multiple powered units, such as locomotives, that are mechanically coupled or linked together in a consist. The consist of powered units operates to provide tractive and/or braking efforts to propel and stop movement of the rail vehicle. The powered units in the consist may change the supplied tractive and/or braking efforts based on a data message that is communicated to the powered units. For example, the supplied tractive and/or braking efforts may be based on Positive Train Control (PTC) instructions or control information for an upcoming trip. The control information may be used by a software application to determine the speed of the rail vehicle for various segments of an upcoming trip of the rail vehicle.

A goal in the operation of the locomotives in a train is to eliminate the need for an operator on-board the train. In order to achieve the goal of providing automatic train operation (ATO), a reliable control system must be provided in order to transmit train control commands and other data indicative of operational characteristics associated with various subsystems of the locomotive consists between the train and an off-board, remote controller interface (also sometimes referred to as the "back office"). The control system must be capable of transmitting data messages having the information used to control the tractive and/or braking efforts of the rail vehicle and the operational characteristics of the various consist subsystems while the rail vehicle is moving. The control system must also be able to transmit information regarding a detected fault on-board a locomotive, and respond with control commands to reset the fault.

One example of a train that includes a control system that allows the transfer of control commands from a lead locomotive to a remote locomotive is disclosed in U.S. Pat. No. 8,364,338 of Peltonen et al. that issued on Jan. 29, 2013 ("the '338 patent"). In particular, the '338 patent discloses a system and method for remotely administering a fault detected on an unmanned powered system that is controlled through a lead powered system. The method includes detecting an operational fault on an unmanned powered system, communicating information about the fault to the lead powered system through a wireless communication protocol, and communicating a reset message to the unmanned powered system.

Although useful in allowing for control of an unmanned remote trailing locomotive in a train by wireless signals sent from a lead locomotive of the train, the system of the '338 patent may be limited. In particular, the '338 patent does not provide a way for a remote operator at a back office or other remote controller interface, or a third party located remotely and with access only to an Internet-connected terminal, to receive information on the status of a locomotive and send commands to the locomotive from the remote controller interface or remote, Internet-connected terminal.

The present disclosure is directed at overcoming one or more of the shortcomings set forth above and/or other problems of the prior art.

SUMMARY

In one aspect, the present disclosure is directed to a control system for remotely configuring a locomotive. The control system may comprise an operational control device located on-board the locomotive, the operational control device being configured in a run configuration when the locomotive is ready for travel. An on-board controller located on-board the locomotive may be configured to switch the operational control device to the run configuration upon receipt of a configuration command signal. An off-board remote controller interface located remotely from the locomotive may be configured to receive a configuration failure signal, wherein the configuration failure signal may be indicative of the operational control device being in a configuration other than the run configuration. The off-board remote controller interface may selectively send the configuration command signal to the on-board controller to switch the operational control device to the run configuration.

In another aspect, the present disclosure is directed to a train control system, wherein the train comprises at least a lead consist of locomotives including at least a lead locomotive and a trailing locomotive, and a trailing consist of locomotives including at least a lead locomotive and a trailing locomotive. The control system may comprise an operational control device located on-board at least one of the locomotives, wherein the operational control device may be configured in a run configuration when the at least one locomotive is ready for travel. An on-board controller may be located on-board the at least one locomotive and may be configured to switch the operational control device to the run configuration upon receipt of a configuration command signal. An off-board remote controller interface located remotely from the train may be configured to receive a configuration failure signal, wherein the configuration failure signal may be indicative of the operational control device being in a configuration other than the run configuration. The off-board remote controller interface may selectively send the configuration command signal to the on-board controller to switch the operational control device to the run configuration.

In yet another aspect, the present disclosure is directed to a method of configuring a locomotive. The method may include selectively configuring an operational control device located on-board the locomotive in a run configuration when the locomotive is ready for travel. Selectively configuring the operational control device may be performed upon receipt of a configuration command signal by an on-board controller located on-board the locomotive. The method may further include receiving a configuration failure signal off-board the locomotive at a remote controller interface, wherein the configuration failure signal may be indicative of the operational control device being in a configuration other than the run configuration. The method may still further include selectively sending the configuration command signal from the remote controller interface to the on-board controller to switch the operational control device to the run configuration.

DETAILED DESCRIPTION

Figure 1:
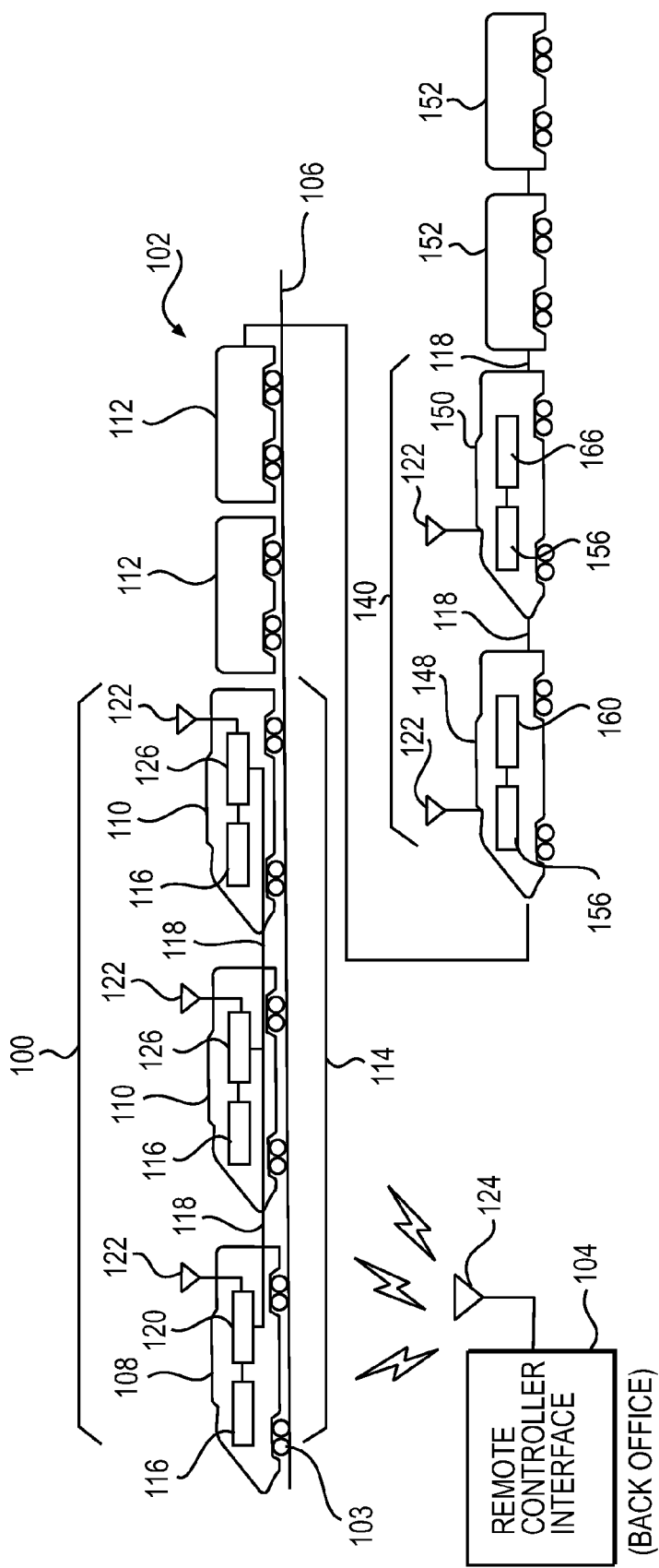
FIG. 1 is a schematic diagram of one embodiment of a control system for a train.

FIG. 1 is a schematic diagram of one embodiment of a control system 100 for operating a train 102 traveling along a track 106. The train may include multiple rail cars (including powered and/or non-powered rail cars or units) linked together as one or more consists or a single rail car (a powered or non-powered rail car or unit). The control system 100 may provide for cost savings, improved safety, increased reliability, operational flexibility, and convenience in the control of the train 102 through communication of network data between an off-board remote controller interface 104 and the train 102. The control system 100 may also provide a means for remote operators or third party operators to communicate with the various locomotives or other powered units of the train 102 from remote interfaces that may include any computing device connected to the Internet or other wide area or local communications network. The control system 100 may be used to convey a variety of network data and command and control signals in the form of messages communicated to the train 102, such as packetized data or information that is communicated in data packets, from the off-board remote controller interface 104. The off-board remote controller interface 104 may also be configured to receive remote alerts and other data from a controller on-board the train, and forward those alerts and data to desired parties via pagers, mobile telephone, email, and online screen alerts. The data communicated between the train 102 and the off-board remote controller interface 104 may include signals indicative of various operational parameters associated with components and subsystems of the train, and command and control signals operative to change the state of various circuit breakers, throttles, brake controls, actuators, switches, handles, relays, and other electronically-controllable devices on-board any locomotive or other powered unit of the train 102.

The off-board remote controller interface 104 may be connected with an antenna module 124 configured as a wireless transmitter or transceiver to wirelessly transmit data messages to the train 102. The messages may originate elsewhere, such as in a rail-yard back office system, one or more remotely located servers (such as in the "cloud"), a third party server, a computer disposed in a rail yard tower, and the like, and be communicated to the off-board remote controller interface 104 by wired and/or wireless connections. Alternatively, the off-board remote controller interface 104 may be a satellite that transmits the message down to the train 102 or a cellular tower disposed remote from the train 102 and the track 106. Other devices may be used as the off-board remote controller interface 104 to wirelessly transmit the messages. For example, other wayside equipment, base stations, or back office servers may be used as the off-board remote controller interface 104. By way of example only, the off-board remote controller interface 104 may use one or more of the Transmission Control Protocol (TCP), Internet Protocol (IP), TCP/IP, User Datagram Protocol (UDP), or Internet Control Message Protocol (ICMP) to communicate network data over the Internet with the train 102. As described below, the network data can include information used to automatically and/or remotely control operations of the train 102 or subsystems of the train, and/or reference information stored and used by the train 102 during operation of the train 102. The network data communicated to the off-board remote controller interface 104 from the train 102 may also provide alerts and other operational information that allows for remote monitoring, diagnostics, asset management, and tracking of the state of health of all of the primary power systems and auxiliary subsystems such as HVAC, air brakes, lights, event recorders, and the like.

The train 102 may include a lead consist 114 of powered locomotives, including the interconnected powered units 108 and 110, one or more remote or trailing consists 140 of powered locomotives, including powered units 148, 150, and additional non-powered units 112, 152. "Powered units" refers to rail cars that are capable of self-propulsion, such as locomotives. "Non-powered units" refers to rail cars that are incapable of self-propulsion, but which may otherwise receive electric power for other services. For example, freight cars, passenger cars, and other types of rail cars that do not propel themselves may be "non-powered units", even though the cars may receive electric power for cooling, heating, communications, lighting, and other auxiliary functions.

In the illustrated embodiment of FIG. 1, the powered units 108, 110 represent locomotives joined with each other in the lead consist 114. The lead consist 114 represents a group of two or more locomotives in the train 102 that are mechanically coupled or linked together to travel along a route. The lead consist 114 may be a subset of the train 102 such that the lead consist 114 is included in the train 102 along with additional trailing consists of locomotives, such as trailing consist 140, and additional non-powered units 152, such as freight cars or passenger cars. While the train 102 in FIG. 1 is shown with a lead consist 114, and a trailing consist 140, alternatively the train 102 may include other numbers of locomotive consists joined together or interconnected by one or more intermediate powered or non-powered units that do not form part of the lead and trailing locomotive consists.

The powered units 108, 110 of the lead consist 114 include a lead powered unit 108, such as a lead locomotive, and one or more trailing powered units 110, such as trailing locomotives. As used herein, the terms "lead" and "trailing" are designations of different powered units, and do not necessarily reflect positioning of the powered units 108, 110 in the train 102 or the lead consist 114. For example, a lead powered unit may be disposed between two trailing powered units. Alternatively, the term "lead" may refer to the first powered unit in the train 102, the first powered unit in the lead consist 114, and the first powered unit in the trailing consist 140. The term "trailing" powered units may refer to powered units positioned after a lead powered unit. In another embodiment, the term "lead" refers to a powered unit that is designated for primary control of the lead consist 114 and/or the trailing consist 140, and "trailing" refers to powered units that are under at least partial control of a lead powered unit.

The powered units 108, 110 include a connection at each end of the powered unit 108, 110 to couple propulsion subsystems 116 of the powered units 108, 110 such that the powered units 108, 110 in the lead consist 114 function together as a single tractive unit. The propulsion subsystems 116 may include electric and/or mechanical devices and components, such as diesel engines, electric generators, and traction motors, used to provide tractive effort that propels the powered units 108, 110 and braking effort that slows the powered units 108, 110.

Similar to the lead consist 114, the embodiment shown in FIG. 1 also includes the trailing consist 140, including a lead powered unit 148 and a trailing powered unit 150. The trailing consist 140 may be located at a rear end of the train 102, or at some intermediate point along the train 102. Non-powered units 112 may separate the lead consist 114 from the trailing consist 140, and additional non-powered units 152 may be pulled behind the trailing consist 140.

The propulsion subsystems 116 of the powered units 108, 110 in the lead consist 114 may be connected and communicatively coupled with each other by a network connection 118. In one embodiment, the network connection 118 includes a net port and jumper cable that extends along the train 102 and between the powered units 108, 110. The network connection 118 may be a cable that includes twenty seven pins on each end that is referred to as a multiple unit cable, or MU cable. Alternatively, a different wire, cable, or bus, or other communication medium, may be used as the network connection 118. For example, the network connection 118 may represent an Electrically Controlled Pneumatic Brake line (ECPB), a fiber optic cable, or wireless connection. Similarly, the propulsion subsystems 156 of the powered units 148, 150 in the trailing consist 140 may be connected and communicatively coupled to each other by the network connection 118, such as a MU cable extending between the powered units 148, 150.

The network connection 118 may include several channels over which network data is communicated. Each channel may represent a different pathway for the network data to be communicated. For example, different channels may be associated with different wires or busses of a multi-wire or multi-bus cable. Alternatively, the different channels may represent different frequencies or ranges of frequencies over which the network data is transmitted.

The powered units 108, 110 may include communication units 120, 126 configured to communicate information used in the control operations of various components and subsystems, such as the propulsion subsystems 116 of the powered units 108, 110. The communication unit 120 disposed in the lead powered unit 108 may be referred to as a lead communication unit. As described below, the lead communication unit 120 may be the unit that initiates the transmission of data packets forming a message to the off-board, remote controller interface 104. For example, the lead communication unit 120 may transmit a message via a WiFi or cellular modem to the off-board remote controller interface 104. The message may contain information on an operational state of the lead powered unit 108, such as a throttle setting, a brake setting, readiness for dynamic braking, the tripping of a circuit breaker on-board the lead powered unit, or other operational characteristics. The communication units 126 may be disposed in different trailing powered units 110 and may be referred to as trailing communication units. Alternatively, one or more of the communication units 120, 126 may be disposed outside of the corresponding powered units 108, 110, such as in a nearby or adjacent non-powered unit 112. Another lead communication unit 160 may be disposed in the lead powered unit 148 of the trailing consist 140. The lead communication unit 160 of the trailing consist 140 may be a unit that receives data packets forming a message transmitted by the off-board, remote controller interface 104. For example, the lead communication unit 160 of the trailing consist 140 may receive a message from the off-board remote controller interface 104 providing operational commands that are based upon the information transmitted to the off-board remote controller interface 104 via the lead communication unit 120 of the lead powered unit 108 of the lead consist 114.

A trailing communication unit 166 may be disposed in a trailing powered unit 150 of the trailing consist 140, and interconnected with the lead communication unit 160 via the network connection 118.

The communication units 120, 126 in the lead consist 114, and the communication units 160, 166 in the trailing consist 140 may be connected with the network connection 118 such that all of the communication units for each consist are communicatively coupled with each other by the network connection 118 and linked together in a computer network. Alternatively, the communication units may be linked by another wire, cable, or bus, or be linked by one or more wireless connections.

The networked communication units 120, 126, 160, 166 may include antenna modules 122. The antenna modules 122 may represent separate individual antenna modules or sets of antenna modules disposed at different locations along the train 102. For example, an antenna module 122 may represent a single wireless receiving device, such as a single 220 MHz TDMA antenna module, a single cellular modem, a single wireless local area network (WLAN) antenna module (such as a "Wi-Fi" antenna module capable of communicating using one or more of the IEEE 802.11 standards or another standard), a single WiMax (Worldwide Interoperability for Microwave Access) antenna module, a single satellite antenna module (or a device capable of wirelessly receiving a data message from an orbiting satellite), a single 3G antenna module, a single 4G antenna module, and the like. As another example, an antenna module 122 may represent a set or array of antenna modules, such as multiple antenna modules having one or more TDMA antenna modules, cellular modems, Wi-Fi antenna modules, WiMax antenna modules, satellite antenna modules, 3G antenna modules, and/or 4G antenna modules.

As shown in FIG. 1, the antenna modules 122 may be disposed at spaced apart locations along the length of the train 102. For example, the single or sets of antenna modules represented by each antenna module 122 may be separated from each other along the length of the train 102 such that each single antenna module or antenna module set is disposed on a different powered or non-powered unit 108, 110, 112, 148, 150, 152 of the train 102. The antenna modules 122 may be configured to send data to and receive data from the off-board remote controller interface 104. For example, the off-board remote controller interface 104 may include an antenna module 124 that wirelessly communicates the network data from a remote location that is off of the track 106 to the train 102 via one or more of the antenna modules 122. Alternatively, the antenna modules 122 may be connectors or other components that engage a pathway over which network data is communicated, such as through an Ethernet connection.

The diverse antenna modules 122 enable the train 102 to receive the network data transmitted by the off-board remote controller interface 104 at multiple locations along the train 102. Increasing the number of locations where the network data can be received by the train 102 may increase the probability that all, or a substantial portion, of a message conveyed by the network data is received by the train 102. For example, if some antenna modules 122 are temporarily blocked or otherwise unable to receive the network data as the train 102 is moving relative to the off-board remote controller interface 104, other antenna modules 122 that are not blocked and are able to receive the network data may receive the network data. An antenna module 122 receiving data and command control signals from the off-board device 104 may in turn re-transmit that received data and signals to the appropriate lead communication unit 120 of the lead locomotive consist 114, or the lead communication unit 160 of the trailing locomotive consist 140. Any data packet of information received from the off-board remote controller interface 104 may include header information or other means of identifying which locomotive in which locomotive consist the information is intended for. Although the lead communication unit 120 on the lead consist may be the unit that initiates the transmission of data packets forming a message to the off-board, remote controller interface 104, all of the lead and trailing communication units may be configured to receive and transmit data packets forming messages. Accordingly, in various alternative implementations according to this disclosure, a command control signal providing operational commands for the lead and trailing locomotives may originate at the remote controller interface 104 rather than at the lead powered unit 108 of the lead consist 114.

Each locomotive or powered unit of the train 102 may include a car body supported at opposing ends by a plurality of trucks. Each truck may be configured to engage the track 106 via a plurality of wheels, and to support a frame of the car body. One or more traction motors may be associated with one or all wheels of a particular truck, and any number of engines and generators may be mounted to the frame within the car body to make up the propulsion subsystems 116, 156 on each of the powered units. The propulsion subsystems 116, 156 of each of the powered units may be further interconnected throughout the train 102 along one or more high voltage power cables in a power sharing arrangement. Energy storage devices (not shown) may also be included for short term or long term storage of energy generated by the propulsion subsystems or by the traction motors when the traction motors are operated in a dynamic braking or generating mode. Energy storage devices may include batteries, ultra-capacitors, flywheels, fluid accumulators, and other energy storage devices with capabilities to store large amounts of energy rapidly for short periods of time, or more slowly for longer periods of time, depending on the needs at any particular time. The DC or AC power provided from the propulsion subsystems 116, 156 or energy storage devices along the power cable may drive AC or DC traction motors to propel the wheels. Each of the traction motors may also be operated in a dynamic braking mode as a generator of electric power that may be provided back to the power cables and/or energy storage devices. Control over engine operation (e.g., starting, stopping, fueling, exhaust aftertreatment, etc.) and traction motor operation, as well as other locomotive controls, may be provided by way of various controls housed within a cab supported by the frame of the train 102. In some implementations of this disclosure, initiation of these controls may be implemented in the cab of the lead powered unit 108 in the lead consist 114 of the train 102. In other alternative implementations, initiation of operational controls may be implemented off-board at the remote controller interface 104, or at a powered unit of a trailing consist.

Figure 2:
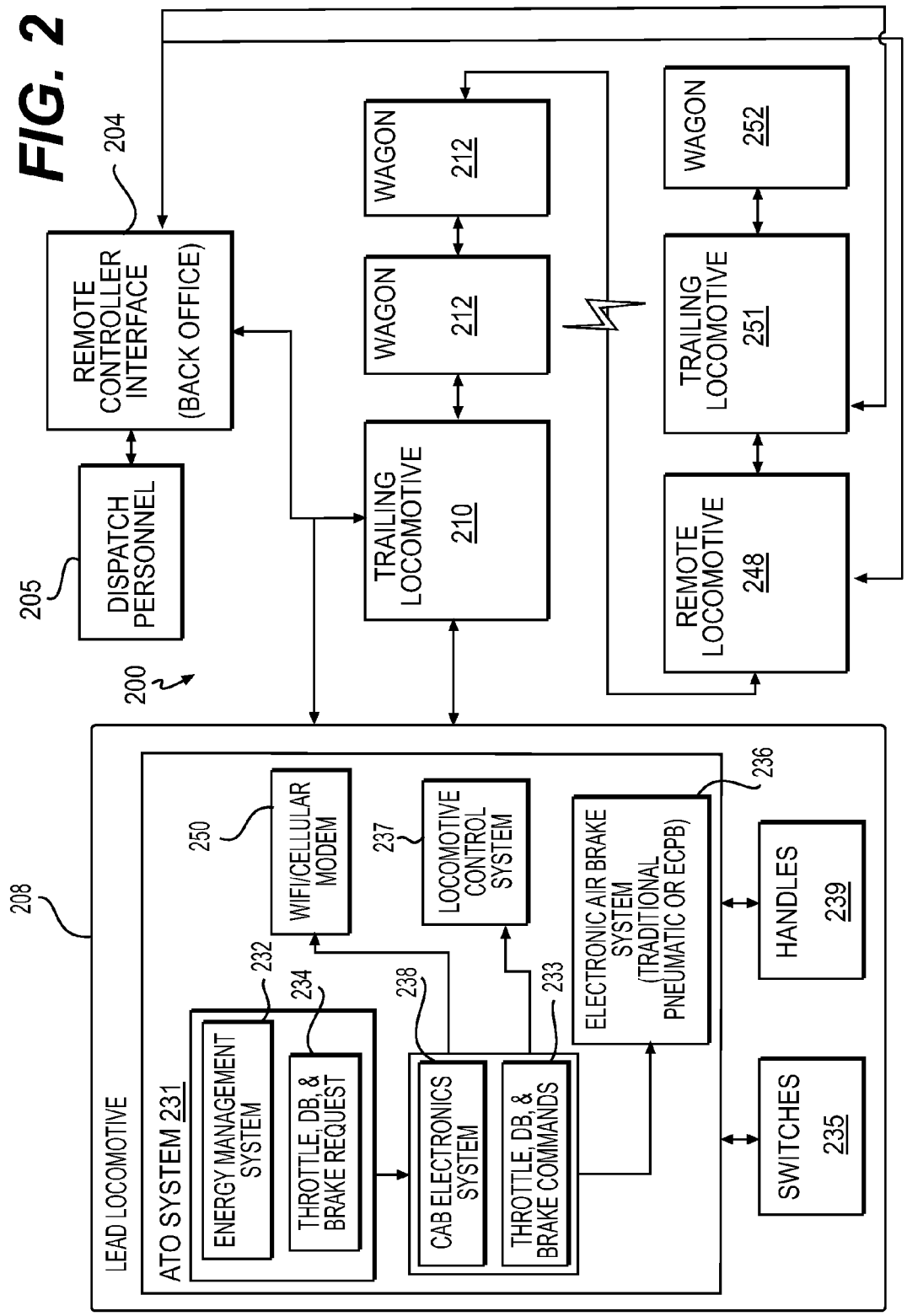
FIG. 2 is a block diagram of one implementation of a portion of the control system illustrated in FIG. 1.

As shown in FIG. 2, the on-board controls may include an energy management system 232 configured to determine, e.g., one or more of throttle requests, dynamic braking requests, and pneumatic braking requests 234 for one or more of the powered and non-powered units of the train. The energy management system 232 may be configured to make these various requests based on a variety of measured operational parameters, track conditions, freight loads, trip plans, and predetermined maps or other stored data with one or more goals of improving availability, safety, timeliness, overall fuel economy and emissions output for individual powered units, consists, or the entire train. The cab of the lead powered unit 208, 248 in each of the consists may also house a plurality of operational control devices, and control system interfaces. The operational control devices may be used by an operator to manually control the locomotive, or may be controlled electronically via messages received from off-board the train. Operational control devices may include, among other things, an engine run/isolation switch, a generator field switch, an automatic brake handle, an independent brake handle, a lockout device, and any number of circuit breakers. Manual input devices may include switches, levers, pedals, wheels, knobs, push-pull devices, touch screen displays, etc.

Operation of the engines, generators, inverters, converters, and other auxiliary devices may be at least partially controlled by switches or other operational control devices that may be manually movable between a run or activated state and an isolation or deactivated state by an operator of the train 102. The operational control devices may be additionally or alternatively activated and deactivated by solenoid actuators or other electrical, electromechanical, or electro-hydraulic devices. As one example, a toggling device associated with an engine (not shown) may be manually and/or autonomously moved to a run state, in which the engine may be allowed to start in response to a command generated from on-board the train 102, or in response to a command received from the off-board remote controller interface 204. The toggling device may also be moved to an isolation state, in which the engine may be shutdown (i.e., turned off) and not allowed to restart. In one embodiment, moving the toggling device to the run state causes startup of the engine and, likewise, moving the toggling device to the isolation state causes the engine to shut down. In another embodiment, moving the toggling device to the run state simply allows subsequent startup of the engine using other input devices, and the toggling device is only moved to the isolation state after engine shutdown to inhibit restart of the engine. In either scenario, the engine may not be restarted from on-board the train while the toggling device is in the isolation state. The operator of the locomotive may manually move the toggling device to the run state at the start of a work shift or trip, and move the toggling device to the isolation position at the end of the work shift or trip. The off-board remote controller interface 204 may also require compliance with security protocols to ensure that only designated personnel may remotely activate or deactivate operational control devices on-board the train from the off-board remote controller interface 204 after certain prerequisite conditions have been met. The off-board remote controller interface may include various security algorithms or other means of comparing an operator authorization input with a predefined security authorization parameter or level. The security algorithms may also establish restrictions or limitations on controls that may be performed based on the location of a locomotive, authorization of an operator, and other parameters.

Circuit breakers may be associated with particular components or subsystems of a locomotive on the train 102, and configured to trip when operating parameters associated with the components or subsystems deviate from expected or predetermined ranges. For example, circuit breakers may be associated with power directed to individual traction motors, HVAC components, and lighting or other electrical components, circuits, or subsystems. When a power draw greater than an expected draw occurs, the associated circuit breaker may trip, or switch from a first state to a second state, to interrupt the corresponding circuit. In some implementations of this disclosure, a circuit breaker may be associated with an on-board control system or communication unit that controls wireless communication with the off-board remote controller interface 204. After a particular circuit breaker trips, the associated component or subsystem may be disconnected from the main electrical circuit of the locomotive 208 and remain nonfunctional until the corresponding breaker is reset. The circuit breakers may be manually tripped or reset. Alternatively or in addition, the circuit breakers may include actuators or other control devices that can be selectively energized to autonomously or remotely switch the state of the associated circuit breakers in response to a corresponding command received from the off-board remote controller interface 204. In some embodiments, a maintenance signal may be transmitted to the off-board remote controller interface 204 upon switching of a circuit breaker from a first state to a second state, thereby indicating that action such as a reset of the circuit breaker may be needed.

As shown in FIG. 2, an exemplary control system 200 according to this disclosure may further include a microprocessor-based locomotive control system 237 having at least one programmable logic controller (PLC), a cab electronics system 238, and an electronic air (pneumatic) brake system 236, all mounted within a cab of the locomotive. The cab electronics system 238 may comprise at least one integrated display computer configured to receive and display data from the outputs of one or more of machine gauges, indicators, sensors, and controls. The cab electronics system 238 may be configured to process and integrate the received data, receive command signals from the off-board remote controller interface 204, and communicate commands such as throttle, dynamic braking, and pneumatic braking commands 233 to the microprocessor-based locomotive control system 237.

The microprocessor-based locomotive control system 237 may be communicatively coupled with the traction motors, engines, generators, braking subsystems, input devices, actuators, circuit breakers, and other devices and hardware used to control operation of various components and subsystems on the locomotive. In various alternative implementations of this disclosure, some operating commands, such as throttle and dynamic braking commands, may be communicated from the cab electronics system 238 to the locomotive control system 237, and other operating commands, such as braking commands, may be communicated from the cab electronics system 238 to a separate electronic air brake system 236. One of ordinary skill in the art will recognize that the various functions performed by the locomotive control system 237 and electronic air brake system 236 may be performed by one or more processing modules or controllers through the use of hardware, software, firmware, or various combinations thereof. Examples of the types of controls that may be performed by the locomotive control system 237 may include radar-based wheel slip control for improved adhesion, automatic engine start stop (AESS) for improved fuel economy, control of the lengths of time at which traction motors are operated at temperatures above a predetermined threshold, control of generators/alternators, control of inverters/converters, the amount of exhaust gas recirculation (EGR) and other exhaust aftertreatment processes performed based on detected levels of certain pollutants, and other controls performed to improve safety, increase overall fuel economy, reduce overall emission levels, and increase longevity and availability of the locomotives. The at least one PLC of the locomotive control system 237 may also be configurable to selectively set predetermined ranges or thresholds for monitoring operating parameters of various subsystems. When a component detects that an operating parameter has deviated from the predetermined range, or has crossed a predetermined threshold, a maintenance signal may be communicated off-board to the remote controller interface 204. The at least one PLC of the locomotive control system 237 may also be configurable to receive one or more command signals indicative of at least one of a throttle command, a dynamic braking readiness command, and an air brake command 233, and output one or more corresponding command control signals configured to at least one of change a throttle position, activate or deactivate dynamic braking, and apply or release a pneumatic brake, respectively.

The cab electronics system 238 may provide integrated computer processing and display capabilities on-board the train 102, and may be communicatively coupled with a plurality of cab gauges, indicators, and sensors, as well as being configured to receive commands from the remote controller interface 204. The cab electronics system 238 may be configured to process outputs from one or more of the gauges, indicators, and sensors, and supply commands to the locomotive control system 237. In various implementations, the remote controller interface 204 may comprise a laptop, hand-held device, or other computing device or server with software, encryption capabilities, and Internet access for communicating with the on-board controller of the lead locomotive 208 of a lead consist and on-board controllers of any other lead or trailing locomotives, such as trailing locomotive 210 in the lead consist, remote lead locomotive 248 in a trailing consist, and trailing locomotive 251 in the trailing consist. Control commands generated by the cab electronics system 238 on the lead locomotive 208 of the lead consist may be communicated to the locomotive control system 237 of the lead locomotive of the lead consist, and may be communicated in parallel via a WiFi/cellular modem 250 off-board to the remote controller interface 204. The lead communication unit 120 on-board the lead locomotive 208 of the lead consist may include the WiFi/cellular modem 250 and any other communication equipment required to modulate and transmit the command signals off-board the locomotive and receive command signals on-board the locomotive.

The control systems and interfaces on-board and off-board the train may embody single or multiple microprocessors, field programmable gate arrays (FPGAs), digital signal processors (DSPs), programmable logic controllers (PLCs), etc., that include means for controlling operations of the train 102 in response to operator requests, built-in constraints, sensed operational parameters, and/or communicated instructions from the remote controller interface 204. Numerous commercially available microprocessors can be configured to perform the functions of these components. Various known circuits may be associated with these components, including power supply circuitry, signal-conditioning circuitry, actuator driver circuitry (i.e., circuitry powering solenoids, motors, or piezo actuators), and communication circuitry.

The locomotives 208, 210, 248, 251 may be outfitted with any number and type of sensors known in the art for generating signals indicative of associated operating parameters. In one example, a locomotive may include a temperature sensor configured to generate a signal indicative of a coolant temperature of an engine on-board the locomotive.

Additionally or alternatively, sensors may include brake temperature sensors, exhaust sensors, fuel level sensors, pressure sensors, knock sensors, reductant level or temperature sensors, speed sensors, motion detection sensors, location sensors, or any other sensor known in the art. The signals generated by the sensors may be directed to the cab electronics system 238 on each locomotive for further processing and generation of appropriate commands.

Any number and type of warning devices may also be located on-board each locomotive, including an audible warning device and/or a visual warning device. Warning devices may be used to alert an operator on-board a locomotive of an impending operation, for example startup of the engine(s). Warning devices may be triggered manually from on-board the locomotive (e.g., in response to movement of a component to the run state) and/or remotely from off-board the locomotive (e.g., in response to commands from the remote controller interface 204.) When triggered from off-board the locomotive, a corresponding command signal used to initiate operation of the warning device may be communicated to the on-board controller and the cab electronics system 238.

The off-board remote controller interface 204 may include any means for monitoring, recording, storing, indexing, processing, and/or communicating various operational aspects of the locomotive 208, 210, 248, 251. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from different types of computer program products or non-transitory computer-readable media such as computer chips and secondary storage devices, including hard disks, floppy disks, optical media, CD-ROM, or other forms of RAM or ROM.

The off-board remote controller interface 204 may be configured to execute instructions stored on computer readable media to perform methods of remote control of a locomotive. That is, as will be described in more detail in the following section, on-board control (manual and/or autonomous control) of some operations of the locomotive (e.g., operations of traction motors, engine(s), circuit breakers, etc.) may be selectively overridden by the off-board remote controller interface 204.

Remote control of the various powered and non-powered units on the train 102 through communication between the on-board cab electronics system 238 and the off-board remote controller interface 204 may be facilitated via the various communication units 120, 126, 160, 166 spaced along the train 102. The communication units may include hardware and/or software that enables sending and receiving of data messages between the powered units of the train and the off-board remote controller interfaces. The data messages may be sent and received via a direct data link and/or a wireless communication link, as desired. The direct data link may include an Ethernet connection, a connected area network (CAN), or another data link known in the art. The wireless communications may include satellite, cellular, infrared, and any other type of wireless communications that enable the communication units to exchange information between the off-board remote controller interface 204 and the various components and subsystems of each of the locomotives or other powered units in the train 102.

As shown in the exemplary embodiment of FIG. 2, the on-board control system of the lead locomotive 208 of a lead consist may comprise an automatic train operation (ATO) system 231. The ATO system 231 may include the energy management system 232 configured to provide throttle requests, dynamic braking requests, and pneumatic braking requests 234 to help regulate movements and/or operations of the various subsystems of the lead locomotive 208 (e.g., direct operations of associated traction motors, engines, alternators, circuit breakers, etc.). The on-board ATO system 231 of the lead locomotive 208 may also include the cab electronics system 238 configured to receive the requests 234 from the energy management system 232 as well as commands from the off-board remote controller interface 204.

As further shown in FIG. 2, the cab electronics system 238 may be configured to receive the requests 234 from the energy management system 232, and commands received via a WiFi/cellular modem 250 from the off-board remote controller interface (back office) 204. The cab electronics system 238 may be configured to communicate commands (e.g., throttle, dynamic braking, and braking commands 233) to the locomotive control system 237 and an electronic air brake system 236 on-board the lead locomotive 208 in order to autonomously control the movements and/or operations of the lead locomotive.

In parallel with communicating commands to the locomotive control system 237 of the lead locomotive 208, the cab electronics system 238 on-board the lead locomotive 208 of the lead consist may also communicate commands to the off-board remote controller interface 204. The commands may be communicated via the WiFi/cellular modem 250, off-board the lead locomotive 208 of the lead consist to the remote controller interface 204. The remote controller interface 204 may communicate commands originated at the remote controller interface 204, or commands received from the lead locomotive 208 to the lead consist trailing locomotive 210, the trailing consist lead locomotive 248, and the trailing consist trailing locomotive 251. The commands may be received at each of the locomotives via additional WiFi/cellular modems on-board each locomotive, and communicated to a cab electronics system on-board each locomotive. The cab electronics systems on-board each locomotive may be configured to communicate the commands received from the lead locomotive 208 of the lead consist via the remote controller interface 204, or commands that originated at the remote controller interface 204 to a locomotive control system and an electronic air brake system on-board each locomotive. The commands from the lead locomotive 208 of the lead consist via the remote controller interface, or directly from the remote controller interface may also be communicated via the network connection 118 from the trailing consist lead locomotive 248 to one or more trailing locomotives 251 of the trailing consists. The result of configuring all of the locomotives of the lead and trailing consists to communicate directly with the off-board remote controller interface 204 is that each locomotive may respond quickly and in close coordination with commands responded to by other locomotives in the train. Additionally, each of the locomotives in various consists along a long train may quickly and reliably receive commands such as throttle, dynamic braking, and pneumatic braking commands 233 initiated by a lead locomotive in a lead consist regardless of location and conditions.

The integrated cab electronics systems 238 on each of the locomotives of the train may also be configured to receive and generate commands for configuring or reconfiguring various switches 235, handles 239, or other operational control devices on-board each of the locomotives of the train as required before the train begins on a journey, or after a failure occurs that requires reconfiguring of all or some of the locomotives. A configuration failure signal may be sent automatically from any one of the locomotives on the train to the off-board remote controller interface 204 after a failure or prior to starting or restarting of the train. Alternatively or in addition, the configuration failure signal may be provided to the off-board remote controller interface as a manual input from an operator. The configuration failure signal may be indicative of one or more operational control devices on-board the locomotive being in a position that is moved away from a run configuration. A "run configuration" of an operational control device, as used herein, refers to the proper configuration of the device before the locomotive is ready to safely move away from a stopped position. The configuration failure signal may inform the remote controller interface 204 that configuring or reconfiguring of an operational control device to a run configuration may be required before the locomotive will be ready to travel.

Dispatch personnel 210 may log into the remote controller interface 204 upon receiving the configuration failure signal or other alert or notification that reconfiguring of one or more of the locomotives is required. Alternatively or in addition, an operator may be aware of a need to reconfigure a locomotive based upon personal observation or other information. "Configuring" or "reconfiguring" a locomotive, as used herein, may refer to all of the actions that are taken before the locomotive is ready for travel. Configuration command signals may be transmitted from the remote controller interface 204 to any locomotive on the train. A configuration command signal may cause automatic reconfiguration of each of the required switches 235, handles 239, and other operational control devices on-board a locomotive into a run configuration after a train has been stopped, or after a critical failure has occurred. Examples of operational control devices such as switches 235 and handles 239 that may require configuring or reconfiguring before a journey or after a failure may include an engine run switch, a generator field switch, an automatic brake handle, and an independent brake handle. Remotely controlled, electronically controlled actuators on-board the locomotives in association with each of the switches 235 and handles 239 may enable remote, autonomous reconfiguring of each of the operational control devices into a run configuration. For example, before the train begins a journey, or after a critical failure has occurred on one of the lead or trailing locomotives, configuration command signals may be sent from the off-board remote controller interface 204 to any or all locomotives in order to automatically reconfigure operational control devices into run configurations without requiring an operator to be on-board the train. Following the reconfiguration of each of the various operational control devices on-board each locomotive into a run configuration, the remote controller interface 204 may also send messages to the cab electronics systems on-board each locomotive appropriate for generating other operational commands such as changing throttle settings, activating or deactivating dynamic braking, and applying or releasing pneumatic brakes. In various alternative implementations, configuration command signals and other messages from the off-board remote controller interface may be communicated wirelessly to a lead locomotive in a consist, and then communicated from the lead locomotive over a wired connection such as the network connection 118 to one or more trailing locomotives in the consist. This capability saves the time and expense of having to delay the train before starting or after an event while sending an operator to each of the locomotives on the train to physically switch and reconfigure all of the devices required.

An exemplary method of configuring a locomotive in a train in accordance with various aspects of this disclosure is described in more detail in the following section.

INDUSTRIAL APPLICABILITY

The control system of the present disclosure may be applicable to any group of locomotives or other powered machines where remote access to particular functions of the machines may be desirable. These functions may normally be controlled manually from on-board each locomotive, and remote access to these functions may provide a way to enable automatic train operation (ATO) when human operators are not present or available at the locomotives. An exemplary implementation of one mode of operation of the control system 200 shown in the embodiment of FIG. 2 will now be described in detail.

During normal operation, a human operator may be located on-board the lead locomotive 208 and within the cab of the locomotive. The human operator may be able to control when an engine or other subsystem of the train is started or shut down, which traction motors are used to propel the locomotive, what switches 235, handles 239, and other operational control devices are reconfigured, and when and what circuit breakers are reset or tripped. The human operator may also be required to monitor multiple gauges, indicators, sensors, and alerts while making determinations on what controls should be initiated. However, there may be times when the operator is not available to perform these functions, when the operator is not on-board the locomotive 208, and/or when the operator is not sufficiently trained or alert to perform these functions. In addition, the control system 200 in accordance with this disclosure facilitates remote access to and availability of the locomotives in a train for authorized third parties, including providing redundancy and reliability of monitoring and control of the locomotives and subsystems on-board the locomotives.

A method of controlling locomotives in lead and trailing consists of a train in accordance with various aspects of this disclosure may include receiving an automatic or manually generated configuration failure signal at the off-board remote controller interface 204. The configuration failure signal may be indicative of a situation at one or more of the locomotives in the train requiring configuration or reconfiguration of various operational control devices on-board the one or more locomotives. Dispatch personnel 205 may then initiate the transmission of a configuration command signal from the remote controller interface 204 directly to the one or more locomotives requiring reconfiguration. In this way, all of the locomotives in the lead and trailing consists of the train may be reconfigured in parallel without requiring an operator on-board the train. The configuration commands signals, like other messages communicated from the remote controller interface 204, may also be transmitted only to a lead locomotive in a consist, and then communicated over a wired connection such as the network connection 118 to one or more trailing locomotives in the consist. As discussed above, on-board controls of the locomotives in the train may also include the energy management system 232 providing one or more of throttle, dynamic braking, or braking requests 234 to the cab electronics system 238. The cab electronics system 238 may process and integrate these requests along with other outputs from various gauges and sensors, and commands such as the configuration command that may have been received from the off-board remote controller interface 204. The cab electronics system 238 may then communicate commands to the on-board locomotive control system 237. In parallel with these on-board communications, the cab electronics system 238 may communicate commands via a WiFi/cellular modem 250 back to the off-board remote controller interface 204. In various alternative implementations, the off-board remote controller interface 204 may further process the commands received from the lead locomotive 208 of the lead consist in order to modify the commands or otherwise interpret the commands before transmitting commands to the locomotives. Modification of the commands may be based on additional information the remote controller interface has acquired from one or more locomotives, trip plans, and information from maps or other stored data. The commands transmitted from the remote controller interface 204 by dispatch personnel 205 may be received from the remote controller interface in parallel at each of the locomotives of multiple trailing consists.

In addition to throttle, dynamic braking, and braking commands, the remote controller interface 204 may also communicate other commands to the cab electronics systems of the on-board controllers on one or more locomotives in multiple consists. These commands may include switching a component such as a circuit breaker on-board a locomotive from a first state, in which the circuit breaker has not tripped, to a second state, in which the circuit breaker has tripped. The circuit breaker may be tripped in response to detection that an operating parameter of at least one component or subsystem of the locomotive has deviated from a predetermined range. When such a deviation occurs, a maintenance signal may be transmitted from the locomotive to the off-board remote controller interface 204. The maintenance signal may be indicative of a subsystem having deviated from the predetermined range as indicated by a circuit breaker having switched from a first state to a second state. The method may further include selectively receiving a command signal from the remote controller interface 204 at a control device on-board the locomotive, with the command signal causing the control device to autonomously switch the component from the second state back to the first state. In the case of a tripped circuit breaker, the command may result in resetting the circuit breaker.

The method of remotely controlling the locomotives in various consists of a train may also include configuring one or more programmable logic controllers (PLC) of microprocessor-based locomotive control systems 237 on-board one or more locomotives to selectively set predetermined ranges for operating parameters associated with various components or subsystems. In one exemplary implementation, a locomotive control system 237 may determine that a circuit of a particular subsystem of the associated locomotive is operating properly when the current flowing through the circuit falls within a particular range. A circuit breaker may be associated with the circuit and configured to trip when the current flowing through the circuit deviates from the determined range. In another exemplary implementation, the locomotive control system may determine that a particular flow rate of exhaust gas recirculation (EGR), or flow rate of a reductant used in exhaust gas aftertreatment, is required in order to meet particular fuel economy and/or emission levels. A valve and/or pump regulating the flow rate of exhaust gas recirculation and/or reductant may be controlled by the locomotive control system when a level of a particular pollutant deviates from a predetermined range. The predetermined ranges for various operating parameters may vary from one locomotive to another based on specific characteristics associated with each locomotive, including age, model, location, weather conditions, type of propulsion system, fuel efficiency, type of fuel, and the like.

The method of controlling locomotives in a train in accordance with various implementations of this disclosure may still further include a cab electronics system 238 on-board a locomotive receiving and processing data outputs from one or more of gauges, indicators, sensors, and controls on-board the locomotive. The cab electronics system 238 may also receive and process, e.g., throttle, dynamic braking, and pneumatic braking requests from the energy management system 232 and/or human operator on-board the locomotive, and command signals from the off-board remote controller interface 204. The cab electronics system 238 may then communicate appropriate commands to the locomotive control system 237 and/or electronic air brake system 236 based on the requests, data outputs and command signals. The locomotive control system 237 may perform various control operations such as reconfiguring operational control devices, resetting circuit breakers, adjusting throttle settings, activating dynamic braking, and activating pneumatic braking in accordance with the commands received from the cab electronics system 238. The locomotive control system 237 may perform the control operations by sending command signals to hardware such as electronically controlled actuators or electrohydraulic actuators associated with the operational control devices, circuit breakers, and other components.

It will be apparent to those skilled in the art that various modifications and variations can be made to the control system and method of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A control system for remotely configuring a locomotive, the control system comprising:
   an operational control device located on-board the locomotive, the operational control device being configured in a run configuration when the locomotive is ready for travel;
   first controller means for controlling the locomotive, the first controller means being located on-board the locomotive and being configured to switch the operational control device to the run configuration upon receipt of a configuration command signal; and
   second controller means for controlling the locomotive, the second controller means being located remotely from the locomotive and being configured to:
      receive a configuration failure signal, the configuration failure signal being indicative of the operational control device being in a configuration other than the run configuration; and
      selectively send the configuration command signal to the first controller means in response to receiving the configuration failure signal to switch the operational control device to the run configuration.

2. The control system of claim 1, wherein the first controller means comprises:
   a locomotive control system; and
   a cab electronics system comprising at least one integrated display computer configured to:

receive and display data from outputs of one or more of machine gauges, indicators, sensors, and controls;
process and integrate the received data;
receive the configuration command signal from the second controller means; and
supply commands based on the data and the configuration command signal to the locomotive control system,
the first controller means being in wireless communication with the second controller means.

3. The control system of claim 1, wherein the second controller means is configured to receive the configuration failure signal either automatically from the locomotive upon detection of the operational control device moving away from the run configuration, or manually from an operator input.

4. The control system of claim 1, wherein the operational control device is at least one of a switch and a handle.

5. The control system of claim 4, wherein the operational control device is at least one of an engine run switch, a generator field switch, an automatic brake handle, and an independent brake handle.

6. The control system of claim 2, wherein the operational control device is configured to be switched to the run configuration by an electronically controlled actuator controlled by the locomotive control system.

7. The control system of claim 2, wherein the second controller means is further configured to send a plurality of configuration command signals in parallel to a plurality of cab electronics systems on-board a plurality of locomotives based on receiving configuration failure signals associated with each locomotive of the plurality of locomotives.

8. The control system of claim 7, wherein at least one cab electronics system of the plurality of cab electronics systems on-board at least one locomotive of the plurality of locomotives is configured to receive at least one configuration command signal of the plurality of configuration command signals from the second controller means via a wired network connection with a lead locomotive in a consist of locomotives including the at least one locomotive of the plurality of locomotives.

9. The control system of claim 2, wherein the locomotive control system is configurable to
receive one or more signals indicative of at least one of a throttle command, a dynamic braking readiness, and a brake command, and
output one or more corresponding command signals configured to change at least one of a throttle position for the locomotive, an activation of dynamic braking, and an application of a brake, respectively.

10. A control system for a train, the train comprising a plurality of locomotives, the plurality of locomotives comprising at least a lead consist of locomotives including at least a lead locomotive and a trailing locomotive, and a trailing consist of locomotives including at least a lead locomotive and a trailing locomotive, the control system comprising:
an operational control device located on-board at least one locomotive of the plurality of locomotives, the operational control device being configured in a run configuration when the at least one locomotive is ready for travel;
first controller means for controlling the at least one locomotive, the first controller means being located on-board the at least one locomotive and being configured to switch the operational control device to the run configuration upon receipt of a configuration command signal; and
second controller means for controlling the at least one locomotive, the second controller means being located remotely from the train and being configured to:
receive a configuration failure signal, the configuration failure signal being indicative of the operational control device being in a configuration other than the run configuration; and
selectively send the configuration command signal to the first controller means in response to receiving the configuration failure signal to switch the operational control device to the run configuration.

11. The control system of claim 10, wherein the first controller means comprises:
a locomotive control system; and
a cab electronics system comprising at least one integrated display computer configured to:
receive and display data from outputs of one or more of machine gauges, indicators, sensors, and controls;
process and integrate the received data;
receive the configuration command signal from the second controller means; and
supply commands based on the data and the configuration command signal to the locomotive control system,
the first controller means being in wireless communication with the second controller means.

12. The control system of claim 10, wherein the second controller means is configured to receive the configuration failure signal either automatically from the locomotive upon detection of the operational control device moving away from the run configuration, or manually from an operator input.

13. The control system of claim 10, wherein the operational control device is at least one of a switch and a handle.

14. The control system of claim 13, wherein the operational control device is at least one of an engine run switch, a generator field switch, an automatic brake handle, and an independent brake handle.

15. The control system of claim 11, wherein the operational control device is configured to be switched to the run configuration by an electronically controlled actuator controlled by the locomotive control system.

16. The control system of claim 11, wherein the second controller means is further configured to send a plurality of configuration command signals in parallel to a plurality of cab electronics systems on-board a plurality of locomotives in the lead and trailing consists based on receiving configuration failure signals from each locomotive of the plurality of locomotives.

17. The control system of claim 16, wherein at least one cab electronics system of the plurality of cab electronics systems on-board at least one locomotive of the trailing locomotives in at least one of the lead and trailing consists is configured to receive at least one configuration command signal of the plurality of configuration command signals from the second controller means via a wired network connection with the lead locomotive in the same consist.

18. The control system of claim 11, wherein the locomotive control system is configurable to
receive one or more signals indicative of at least one of a throttle command, a dynamic braking readiness, and a brake command, and
output one or more corresponding command signals configured to change at least one of a throttle position for the locomotive, an activation of dynamic braking, and an application of a brake, respectively.

19. A method for configuring a locomotive, the method comprising:

selectively configuring an operational control device located on-board the locomotive in a run configuration when the locomotive is ready for travel, the selectively configuring being performed upon receipt of a configuration command signal by an on-board controller located on-board the locomotive;

receiving a configuration failure signal off-board the locomotive at a remote controller interface, the configuration failure signal being indicative of the operational control device being in a configuration other than the run configuration; and selectively sending the configuration command signal from the remote controller interface to the on-board controller in response to receiving the configuration failure signal at the remote controller interface to switch the operational control device to the run configuration.

20. The method of claim 19, further comprising:

receiving data from outputs of one or more of machine gauges, indicators, sensors, and controls at a cab electronics system of the on-board controller;

processing and integrating the received data;

receiving the configuration command signal from the remote controller interface at the cab electronics system;

supplying commands based on the received data and the configuration command signal to a locomotive control system of the on-board controller; and controlling an electronically controlled actuator with the locomotive control system to switch the operational control device to the run configuration.

\* \* \* \* \*